United States Patent
Autio et al.

(10) Patent No.: US 7,623,119 B2
(45) Date of Patent: Nov. 24, 2009

(54) GRAPHICAL FUNCTIONS BY GESTURES

(75) Inventors: Markku Tapio Autio, Oulu (FI); Jami Jarkko Juhani Järviö, Oulu (FI)

(73) Assignee: Nokia Corporation, Espoo (FI)

( * ) Notice: Subject to any disclaimer, the term of this patent is extended or adjusted under 35 U.S.C. 154(b) by 850 days.

(21) Appl. No.: 10/830,192

(22) Filed: Apr. 21, 2004

(65) Prior Publication Data

US 2005/0237308 A1    Oct. 27, 2005

(51) Int. Cl.
*G09G 5/00* (2006.01)

(52) U.S. Cl. .................. 345/173; 345/179; 715/828

(58) Field of Classification Search .............. 345/156, 345/173, 174, 175, 177, 178, 179, 581; 715/810, 715/825, 826, 828; 348/734; 700/83; 349/12; 455/550.1; 710/73
See application file for complete search history.

(56) References Cited

U.S. PATENT DOCUMENTS

| | | | |
|---|---|---|---|
| 5,283,559 A | 2/1994 | Kalendra et al. | 345/168 |
| 5,404,458 A | 4/1995 | Zetts | 395/275 |
| 5,537,608 A | 7/1996 | Beatty et al. | 395/800 |
| 6,262,718 B1 | 7/2001 | Findlay et al. | 345/178 |
| 6,331,867 B1 | 12/2001 | Eberhard et al. | 345/864 |
| 6,359,615 B1 | 3/2002 | Singh | 345/173 |
| 6,415,138 B2 | 7/2002 | Sirola et al. | 455/90 |
| 6,555,235 B1 | 4/2003 | Aufderheide et al. | 428/447 |
| 6,624,832 B1 | 9/2003 | Thomas | 345/863 |
| 6,633,746 B1 | 10/2003 | Walsh et al. | 455/31.3 |

*Primary Examiner*—Abbas I Abdulselam
(74) *Attorney, Agent, or Firm*—Harrington & Smith, PC (57) ABSTRACT

A method for operating a computer through a touch sensitive display interface includes displaying a computer generated graphical image on a touch sensitive display using display software. The display software includes programs used to display the graphical image (e.g., display driver and web browser), and is responsive to inputs at a first, active portion (e.g., coinciding with toolbars, hyperlinks) of the touch sensitive display when the graphic image is displayed, and is non-responsive to a second, inactive portion. In the method, an input character is received at the second, inactive portion of the touch sensitive display, and is compared to a stored command character that is associated with a separate corresponding computer command. The separate corresponding computer command is executed if the input character matches the command character. In one embodiment, one particular input character results in emulating a right mouse button by displaying a submenu of shortcut icons, and the method is implemented by operation of a computer program in a mobile station.

22 Claims, 7 Drawing Sheets

GRAPHICAL FUNCTIONS BY GESTURES

FIELD OF THE INVENTION

The present invention relates to touch sensitive user interfaces for electronic computing devices, and to executing different functions within the computing device based on the context of those inputs in relation to a displayed graphical image.

THE BACKGROUND

Continued miniaturization and expanded functionality represent two long-term trends in the consumer electronics industry. Both trends operate in opposition, and so continuously drive a need for user interfaces that are sufficiently large in size and intuitive for consumer acceptance on the one hand, yet facilitating ever-increasing functionality on the other. These competing constraints are especially acute with portable devices, which span a variety of functions that typically operate on non-standardized operating system platforms. The result is that mobile terminals, personal digital assistants, wireless email devices (e.g., Blackberry®, and the like each employ a user interface different from the other mobile devices. As these devices become more ubiquitous and product life cycles diminish, the average consumer is willing to devote less time to learning any individual system platform. As such, user interfaces must remain intuitive while still enabling the increased functionality of the underlying device. A consumer using several disparate devices must especially adapt readily to each user interface, else a device's increased capabilities will go unused and unrecognized by the consumer.

Two developments have greatly enabled more compact devices to maintain an intuitive user interface that enables many consumers to intuitively explore various capabilities of a portable device: soft keys and touch screens. A soft key is a button that executes different functions depending upon actions taken previously. The specific function of a soft key at any given time is typically displayed on a display screen immediately adjacent to the key itself, so a user needs merely read a one or two word description of the current soft key function. The touch screen enables the 'keys' to be on the display itself. In addition to enabling a text display next to each soft key to describe its current function, a touch screen also enables the manufacturer to enlarge the screen itself since fewer if any physical keys need be disposed immediately adjacent to the screen. Many device manufacturers have refined their touch screens to operate with a stylus, enabling more functions to be displayed on a single screen graphic and precision selection by the stylus as opposed to the relatively outsized adult man's finger.

One prior art touch screen device and method is described in U.S. Pat. No. 5,404,458. A pointing device moved across the surface of a touch screen generates positional information. Motion of the pointing device is recognized depending upon a response of a delay timer, so that the computer system coupled to the touch screen may accept the input information in a mouse-emulating mode. However, this description appears limited to emulate only the most basic mouse functions, such as those done by a single button mouse. Like many user interfaces, mouse input devices have not remained stagnant but have added additional inputs such as a second and third button, a wheel, etc, to access different functions of underlying computer programs.

Another prior art device is described in U.S. Pat. No. 5,537,608 as an apparatus having a touch screen user interface and a navigation utility file for initiating execution of files and monitoring the sequence in which file execution occurs. The navigation utility maintains a stack in the memory into which the calling sequences of files are stored according to the order in which the files were executed.

Currently, certain individual portable electronic devices seek to converge multiple functions previously handled by separate devices. For example, several models of mobile phones now include a personal digital assistant, video gaming capability, wireless internet compatibility, instant messaging, debit/credit account access, and a digital camera. Ideally, each of these separate functions is interoperable with other functions of the same device. For example, a digital picture taken with the camera may be sent via email to an acquaintance whose contact information is stored in the digital assistant, or instant messaging may be used to initiate a multi-player video game among the multiple players. Additionally, wireless protocols such as Bluetooth™ have become more standardized, enabling printers, faxes, and the functions of other peripheral equipment to be readily controlled by and incorporated into portable devices such as mobile stations. This interoperability across what were once disparate platforms drives a new need for improvements in user interfaces, especially interfaces of portable electronic devices that are more constrained in size and more multi-functional. The present invention is directed toward such an improved interface that may be used in portable or non-portable electronic computing devices.

As may be appreciated, what is needed in the art is a technique to better enable a user to transition from a display of a graphical image to another computer program or function, such as printing or emailing the graphical image. Small electronic devices carrying many computer programs that perform multiple disparate functions are sometimes confusing or frustrating in moving between programs, or in executing one program that differs from the active program displaying the image. Such a technique is preferably operable with a touch sensitive display screen.

SUMMARY OF THE INVENTION

In one aspect, the present invention includes a method for operating a computer through a touch sensitive display interface. The method includes displaying a computer generated graphical image on a touch sensitive display using a display software program. The display software program includes all programs used to display the graphical image, such as a display driver in combination with a web browser used to display a graphical image of a web page. Though the entire touch sensitive display may be manufactured to be responsive to a pressure input anywhere on the display, the display software is responsive to inputs at a first, active portion of the touch sensitive display when the graphic image is displayed, and non-responsive to a second, inactive portion of the display. For example, the active portion may coincide with scrolling operators, toolbars, hyperlinks and the like, whereas the non-responsive portion is the remainder of the screen where a touch input is not accepted by the prior art display software program. In the method, an input character is received at the otherwise inactive portion of the touch sensitive display. That input character is compared to a stored command character that is associated with a separate corresponding computer command. The separate corresponding computer command is executed only if the input character matches the command character. This differs from prior art touch sensitive displays in that the screen accepts the input only if the input is a character that matches a stored command character, whereas in the prior art the input caused a command to execute based only on its location on the touch screen.

In this manner, various character inputs can be used to execute separate corresponding computer commands by means of intermediary command characters associated with the computer commands. The command characters and their association with a separate computer application command may be stored in a table. The formerly non-responsive portion of the touch sensitive screen is used for accessing other programs apart from the display software, streamlining movement between applications while using only existing user interface hardware.

One embodiment of the present invention is using the input character to emulate a secondary (normally rightmost) mouse button once the input character is deemed to match a command character. For example, when the display software is used with hardware that includes a mouse input device, activation of the rightmost mouse button might cause a pop-up menu of applications to appear (e.g., print the image, send the image, set the image as wallpaper, etc.). The present invention is most advantageous when used in devices that use a touch sensitive display and no mouse input device. In the example, the present invention causes the pop-up menu of applications to appear by emulating depression of the secondary mouse button when in fact there is no mouse input device. It does this by receiving an input at the otherwise inactive portion of the touch sensitive display, and if a character input there matches a command character, it causes the display program (which displays the pop-up menu) to act as if it received an input from the secondary mouse button.

In another aspect, the present invention improves upon an electronic device for displaying a graphical image at a touch sensitive user interface using a displaying software program, where the device further stores a separate computer command apart from the displaying software program. The improvement includes a computer program embodied in a computer readable medium. The computer program includes instructions for causing a computer to receive an input at a portion of the touch sensitive user interface that is not recognized as active by the display program. Further, the instructions cause a computer to compare the received input to a stored command character that is associated with the separate computer command. And the instructions cause a computer to execute the separate computer command if the received input matches the stored command character. Preferably, the device comprises a mobile station, such as a mobile telephone capable of exhibiting highly varied functionality within a physically small device that has a very limited display screen.

In another aspect, the present invention is a method for operating a touch sensitive display interface of a computer. This method includes receiving an input at a touch sensitive display screen, and interpreting the input into a character that is previously stored in a memory. The character may be a Unicode character or an ASCII character. A starting coordinate of the input is stored. The character is mapped to a command, and the command is executed command using the stored starting coordinate as a parameter of the command. Only if the input is interpreted into a previously stored character is the command executed (though that does not imply that this is the only way the command may be executed; other inputs apart from the present invention may cause it to execute). If the input does not sufficiently match a character stored in memory, it is not recognized by the computer and the command does not execute as a result. For example, assume that a computer program practicing the present invention maps a circle with a starting point in the region bounded by coordinates 60<x<75 and 20<y<42 to a Unicode character that executes the command of displaying a particular pulldown menu. Regardless of the exactness of a particular circle scribed by a user, the pulldown menu will not be displayed unless the actual starting coordinates are within the bounded region. Similarly, if the starting coordinates are within the bounded region but the inventive software does not recognize the scribed input as a circle (e.g., corners too sharp), the pulldown menu will not be displayed.

In another aspect, the invention is a method of operating a touch sensitive display interface. This method includes first displaying a graphical image on at least a portion of a touch sensitive display. The method further includes sensing a set of contiguous pixels on at least the portion of the touch-sensitive that are highlighted by a user, wherein the portion is that portion where the graphical image is displayed. The set of contiguous pixels are analyzed to determine a two-dimensional input pattern, such as a circle, check, etc. The two dimensions are spatial dimensions. The input pattern is then correlated to one of at least two command characters stored in a memory. A command associated with the command character that is so correlated is then executed, which changes what is displayed on the display interface in accordance with the command. Preferably, the display is changed by displaying a menu over only a portion of the graphical image.

BRIEF DESCRIPTION OF THE DRAWINGS

The present invention is best understood when considered in light of the accompanying drawings, summarized as follows.

DETAILED DESCRIPTION

Figure 1A:
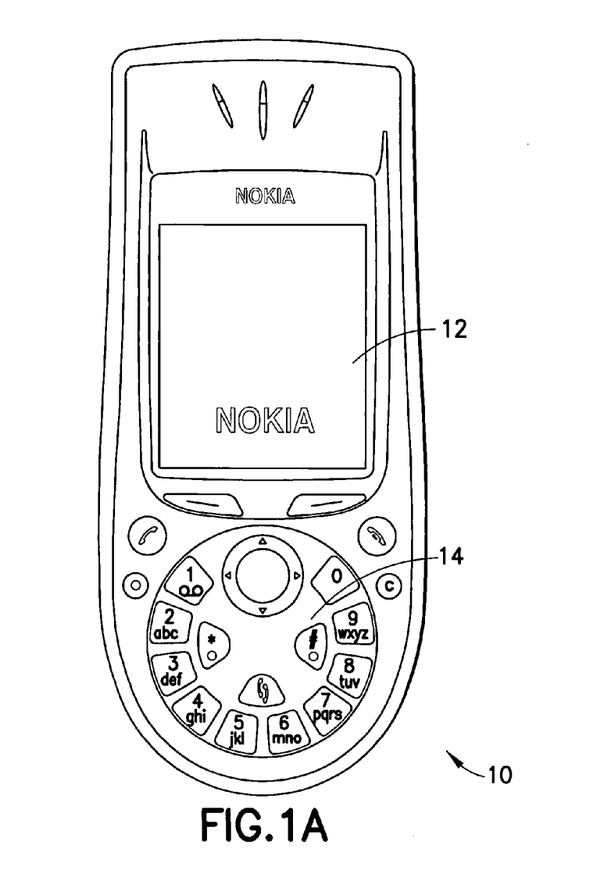
FIG. 1A is a plan view of a prior art portable electronic computing device that incorporates a user interface according to the present invention.
Figure 1B:
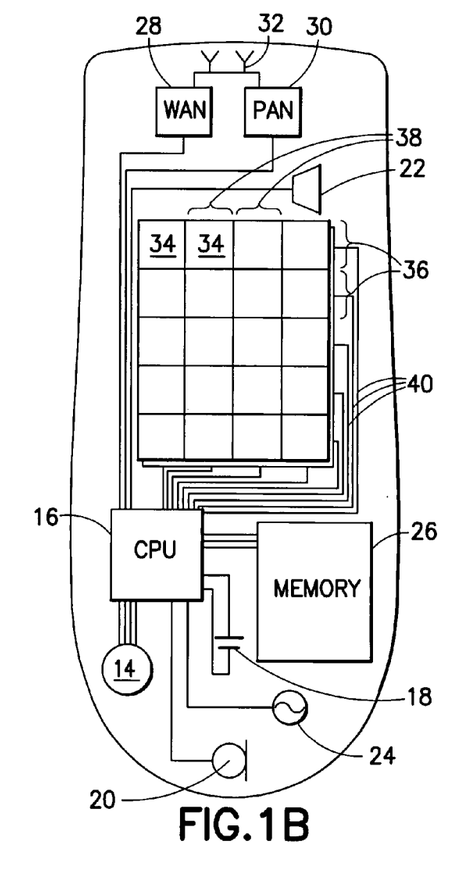
FIG. 1B is a functional block diagram of the device of FIG. 1 showing a touch-sensitive display screen divided into separate sensing cells.

FIG. 1 shows in perspective view an exemplary electronic computing device 10 of which the present invention may be embodied, a mobile station that includes a display screen 12 and a traditional pushbutton-type user interface 14. Major components of the device 10 of FIG. 1A, as well as those relevant to the present invention are depicted in block diagram form at FIG. 1B, wherein the display 12 of each is located in the same position. A processor 16 or central processing unit CPU draws power from a power source 18 such as a battery (for a portable device) or a hardwired AC source (as in a non-portable device such as a laptop computer coupled to a docking station). The CPU 16 is coupled to various transducers such as a microphone 20 and a speaker 22 as in the prior art. The CPU 16 keeps various functions synchronized via a clock 24, and is coupled to one or more memories 26 such as flash memory, volatile memory, non-volatile memory, and the like that may be embodied in physically separate or physically combined computer storage media. Where the device 10 is a mobile station, the CPU 16 is coupled to a wide area network WAN transceiver 28 for communicating over a traditional mobile network through base stations that enable the mobile station 10 to communicate through a public switched telephone network. More recently developed devices 10 further include a personal area network PAN transceiver 30 that enables communication directly with other similarly equipped devices within a relatively short distance. For example, Bluetooth™ is one PAN protocol that enables compatible devices to communicate among one another within a range of about thirty feet. The WAN transceiver 28 and the PAN transceiver 30 may share certain physical components, and each is coupled to one or more antennas 32 that may be internal or external to a housing that encloses the above-noted components.

The display screen 12 is touch sensitive, and may thereby serve as a user input by sensing pressure applied to the surface of the display screen 12. Touch sensitive screens 12 generally employ resistive, capacitive, or surface acoustic wave (SAW) surface transducers to convert pressure along the screen surface to electrical signals.

Capacitive and resistive screens may employ a pair of planar layers disposed parallel to one another and spaced by a non-conductive spacer medium (preferably an acrylic pressure-sensitive adhesive PSA or alternatively a silicone based PSA). The layer nearer to the user is typically termed a flexible layer, and the opposing layer is a stable layer, and each have conductive coatings disposed on facing surfaces. Pressure applied to the touch sensitive screen 12 by a stylus locally deforms the flexible layer, breaching the spacer material and causing the conductive coating on the flexible layer to contact the conductive coating on the stable layer at a localized point. The flexible layer is resilient so that upon release of pressure from the stylus, contact is broken between the flexible and stable layers and the non-conductive spacer medium re-establishes itself between the flexible and stable layers. Matrix touch screens generally have transparent conductive (resistive) coating patterned in rows on one layer and in columns on another layer, allowing a logical processing unit such as a CPU 16 to determine a location along the entire touch sensitive screen 12 at which an input was made. Analog touch screens typically use an indium-tin-oxide material disposed across the entire flexible and stable layers so that they each exhibit a uniform sheet resistivity. Bus bars disposed along perpendicular edges of opposed layers enable a linear voltage gradient to be imposed along each layer (e.g., a horizontal voltage gradient across the stable layer and a vertical voltage gradient across the flexible layer). When a stylus input is imposed at the flex layer, the layers touch at that point. One layer is used to receive the voltage created by the gradient of the other layer at the point of contact, the role of each layer is reversed, and the voltage is measured on the other layer. In this manner, the particular point of input is determinable.

SAW screens operate by propagating acoustic waves in a uniform manner across a surface such as a glass surface of a cathode ray tube display. Disturbances in the surface propagation of those waves, such as may be made by the touch of a finger or stylus, are detected and spatially isolated based on the propagation characteristics of the deformed waves.

In one embodiment such as a matrix touch screen, the display screen is divided into a plurality of cells 34 such as may be defined by the intersection of a row 36 and a column 38 as depicted in FIG. 1B. Each row 36 and column 38 carries a separate lead 40 to the CPU 16, so that a user entry at any particular cell 34 may be spatially identified by the CPU 16 based on the leads 40 for the row 36 and column 38 that return a signal to the CPU 16. While five rows 36 and four columns 38 are shown, more or less of either may be employed. For larger numbers of cells 34, it is preferable to increase the threshold pressure at which an input is registered as compared to a display with fewer cells 34. This is so that a stylus becomes a preferred input device as opposed to a user's fingertip, since the latter's larger size renders it less spatially selective across the display 12 and a stylus enables greater precision due to the greater number of cells 34.

Figure 2A:
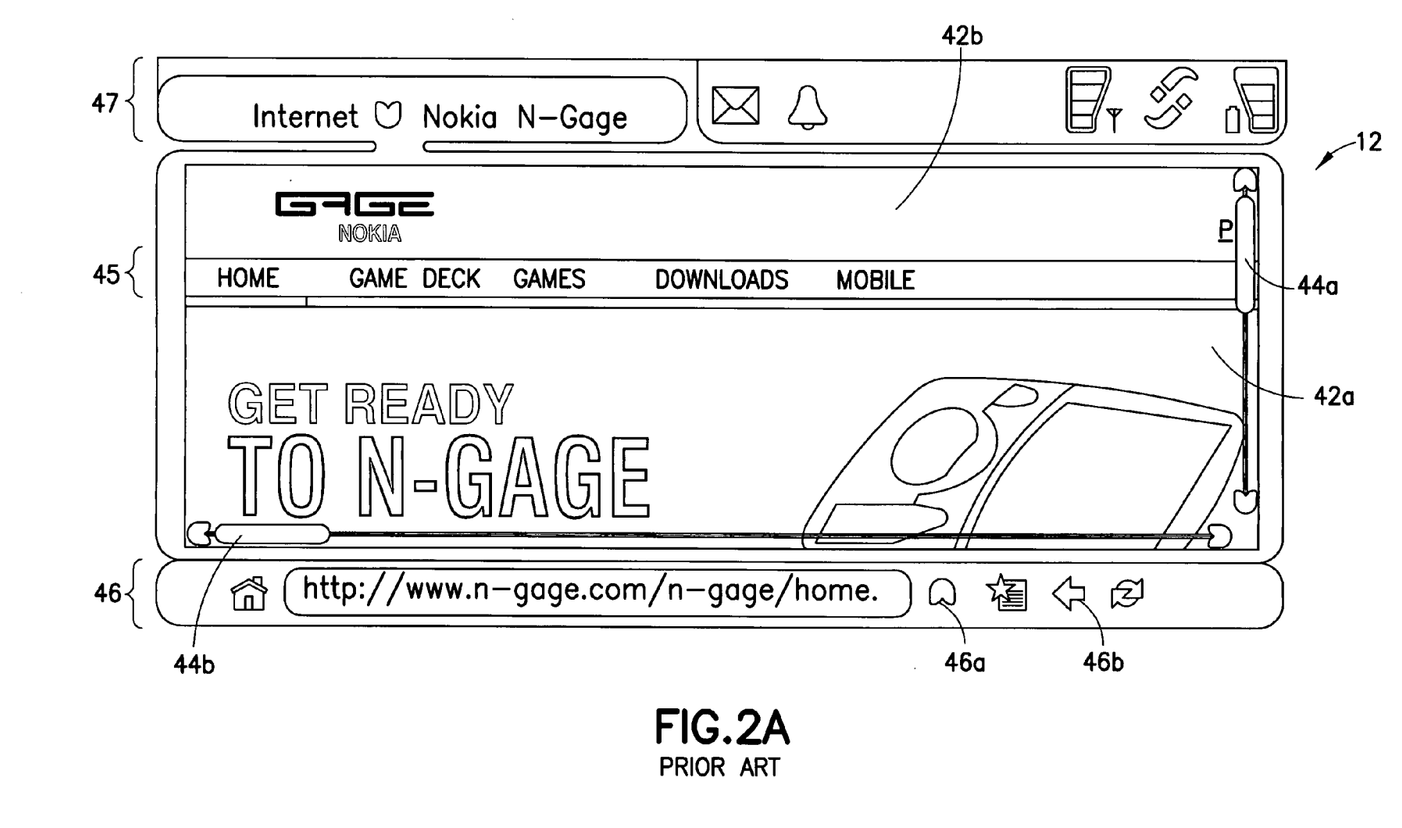
FIG. 2A is a perspective view of a graphic displayed on a touch sensitive screen as in the prior art.

Stored within the memory 26 is one or more graphical images 42a, 42b that may be displayed on the touch-sensitive screen 12. For example, a pre-set background image may be stored in a non-volatile portion of memory 26, or a digital photo may be stored in a volatile portion of memory 26, or a page from an internet site (a web page) may be stored in a temporary cache of a volatile memory 26, each of which may be displayed as a graphical image 42a on the touch-sensitive screen 12. FIG. 2A depicts a perspective view of the touch-sensitive display screen 14 with a web page as the main graphical image 42a and a banner-type image 42b disposed above it. Typically, not every portion of the display screen 14 is occupied by a graphical image 42a, 42b.

Depending upon the software program used to enable display of the graphical image 42a, 42b, various attributes of that program may be superimposed over the graphical images 42a, 42b or alongside them. For example, scrolling operators 44a, 44b along perpendicular margins of the display screen 12 allow a user to scroll horizontally or vertically to view different portions of the underlying entire image, when the screen 12 does not display the entire underlying image as a whole. Various toolbars such as a medial toolbar 45 that divides the two graphical images 42a, 42b from one another, a lower toolbar 46 that indicates the internet address of the current graphic 42a, 42b, and an upper toolbar 47 may be disposed over or about the graphics 42a, 42b. These toolbars generally include various buttons 46a, 46b, for performing various different functions quickly, such as launching a different computer program. Alternatively, submenus may be accessed as indicated by the medial toolbar 45. Each of these, the toolbars and scrolling operators, are attributes of the software program used to display the graphical images 42a, 42b, and do not form part of the graphical images themselves.

For example, in the instance wherein the graphic 42a being displayed is a web page as in the prior art perspective view of FIG. 2A, the scrolling operators 44a, 44b, and toolbar 46 do not form part of the graphic 42a but instead represent a prism through which the graphic 42a is viewed. That prism is an attribute of the particular web browser software used to access the web page. Absent a user change to the web browser software format or view submenu, all web pages displayed by that software program will include the same toolbars and scrolling operators. Similarly, a digital photograph or drawing is a graphical image that may be displayed with an image or photo editor software program. That software program may include similar scrolling operators that do not form part of the underlying digital photograph or drawing. Hyperlinks are also not part of the graphical image, as a hyperlinking word's ability to hyperlink may be switched on or off at a submenu of the software program that displays the graphical image that contains the hyperlink. In that aspect, a hyperlink differs from a toolbar or a scrolling operator only in that it is not always located at a marginal edge of the graphical image.

Typically, a touch sensitive display driver operates in conjunction with another software program specific to the graphical image, such as web browser or photo-editor computer software programs to display the graphical image 42a, 42b on the touch sensitive display and receive inputs therefrom. Whether one program or more than one in conjunction with one another, the software means for displaying the graphical image and receiving inputs at the touch sensitive display is termed herein the display program. The display program operates with the touch sensitive display so that certain areas associated with the toolbars 45, 46, 47, the scrolling operators 44a, 44b, and hyperlinks are (herein termed) active areas when the graphical image is displayed. Active areas are those areas where any user input at the touch sensitive display is received as an input by the electronic device 10. Active areas are thus totally coordinate dependent; a user's touch input will be accepted, for example, at a hyperlink whether or not the user taps the hyperlink icon or scribes a diagonal across the entire screen that happens to pass over the hyperlink. Inactive areas are those that at which a user touch input will not be recognized based merely on the input location on the touch screen. In the prior art, these inactive areas are wholly inactive; no input will be recognized at all. The active areas and inactive areas depend from the image being displayed; some may be displayed with scrolling operators, some may be displayed in full and no scrolling operators are necessary, some may include hyperlinks, etc. Typically, the input in the prior art is a tap or a touch-and-drag operation, the display driver would designate all cells 34 as active, but only a portion of the cells 34 are active when a graphical image is displayed due to operation of the image specific program (e.g., the web browser, the image editor) rendering all cells inactive save those associated with toolbars, scrolling operators, and hyperlinks.

An important distinction between the present invention and the prior art is that, for any given graphical image that is displayed, a touch screen according to the prior art accepts inputs only if the location on the screen at which the input is made is an active area. In the present invention, the input is accepted when the nature of the input pattern (e.g., circle, check, square) sufficiently matches a character stored in memory. The present invention may impose further conditions such as a touchdown point and/or a liftoff point within a particular region on the screen, but whether or not an input is accepted depends at least on the shape of that input. A mere tap is dot, which theoretically has no dimensions and therefore no shape. The present invention determines whether or not to execute a command in response to a touch-screen input based at least partially on other than the physical location of the input on the screen. Where the prior art is a touch-screen notepad where every entry that a user scribes is entered as a corresponding darkened pixel on the screen, there is no option for the computer not to display the user's input directly as darkened pixels. The present invention conditions execution of the command on at least the shape of the user's continuous touch screen entry.

Figure 2B:
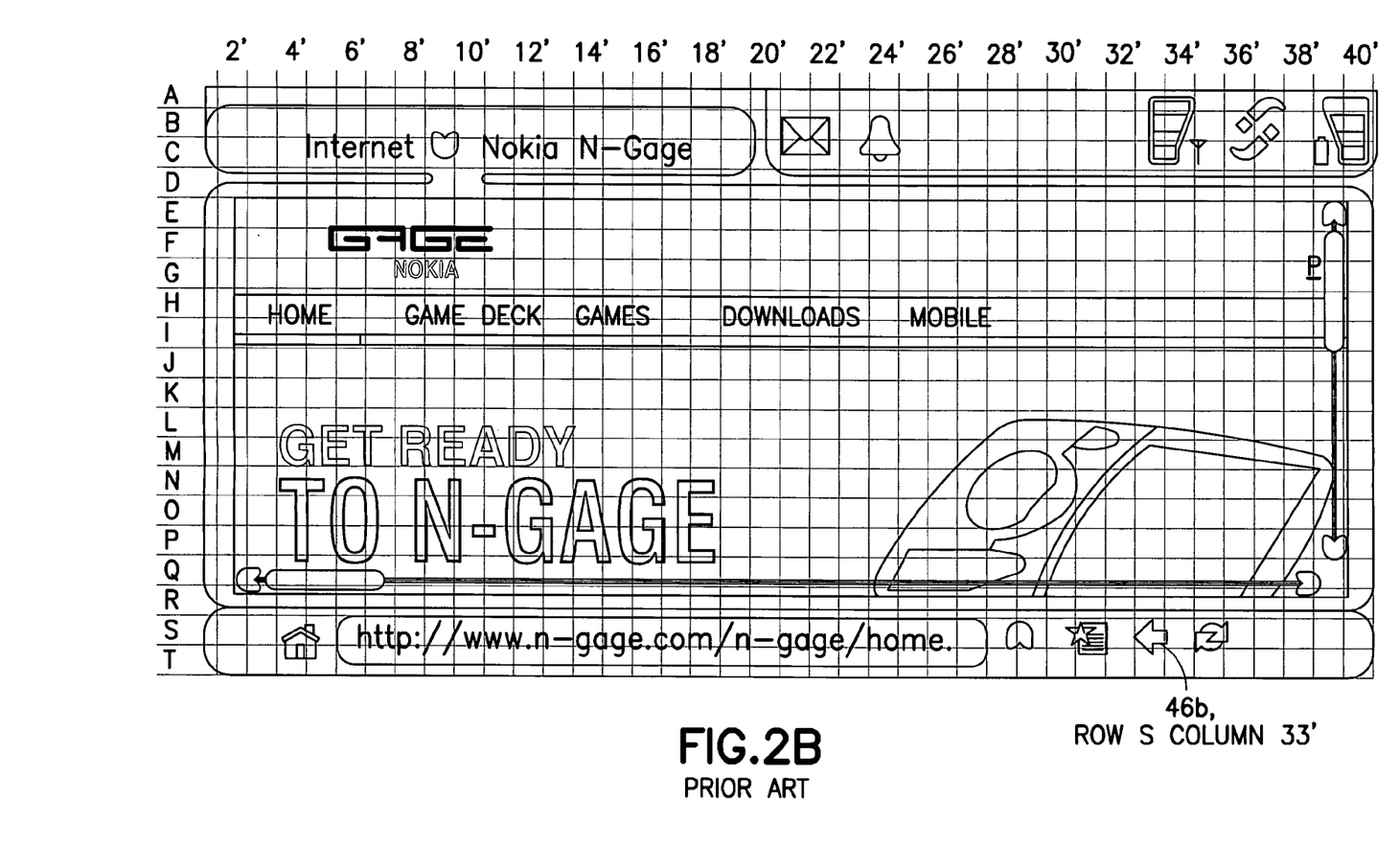
FIG. 2B is similar to FIG. 2A but with a grid representing the touch sensitive screen superimposed over the graphic.

FIG. 2B depicts the touch sensitive display 12 identical to that of FIG. 2A but divided into cells 34, each cell identified by a row 36 (labeled A through T) and column 38 (1' through 40', only even numbers labeled). For example, row S, column 33' of FIG. 2B corresponds to a 'back' button 46b. A tap input at cell S-33' will execute the 'back' function of the web browser program, recalling the previous web address from memory and accessing it, either in real time over the web or from a cached memory of the web page. Rows F-G-H-I and column 39' correspond to the vertical scroll operator 44a. Touching and dragging the vertical scroll operator 44a not only changes the display of the graphical image 42a, it also changes the cells in which the vertical scroll operator 44a are active as the display of the image changes. For the web browser of the prior art displaying a graphical image as illustrated in FIG. 3B, generally all cells between rows J and P and between columns 3' to 38' are inactive; an input in those areas is not recognized as an input by the display program.

The present invention enables an input at those inactive cells only under certain circumstances, best explained with reference to FIGS. 3A-3B. A stylus 50 or other input mechanism (finger, pen point, etc.) is used to scribe a character 52 over the graphical image 42a, 42b, on the touch sensitive display 12 in an area that is considered non-active by the display program. The first point or cell 34 at which the stylus 50 depresses the touch sensitive display 12 is termed a touchdown point 54. Similarly, the last point or cell 34 of a character is termed a termination point 56, and is that point or cell 34 in which the character is complete (as determined by the inventive program when the scribed character 52 matches a character stored in memory), the stylus 50 is lifted off the touch sensitive display 12, or the stylus 50 is stopped for a minimum threshold of time. Preferably, the liftoff point 56 is the first occurrence of the above three options. Only when the entered character 52 matches a character stored in memory does the device 10 act on an input at the cells 34 that are deemed inactive by the display program, at least when the present invention is embodied on a computer readable medium as a computer software program. The entered character represents an uninterrupted series of cells depressed at the touch sensitive display 12.

Figure 3A:
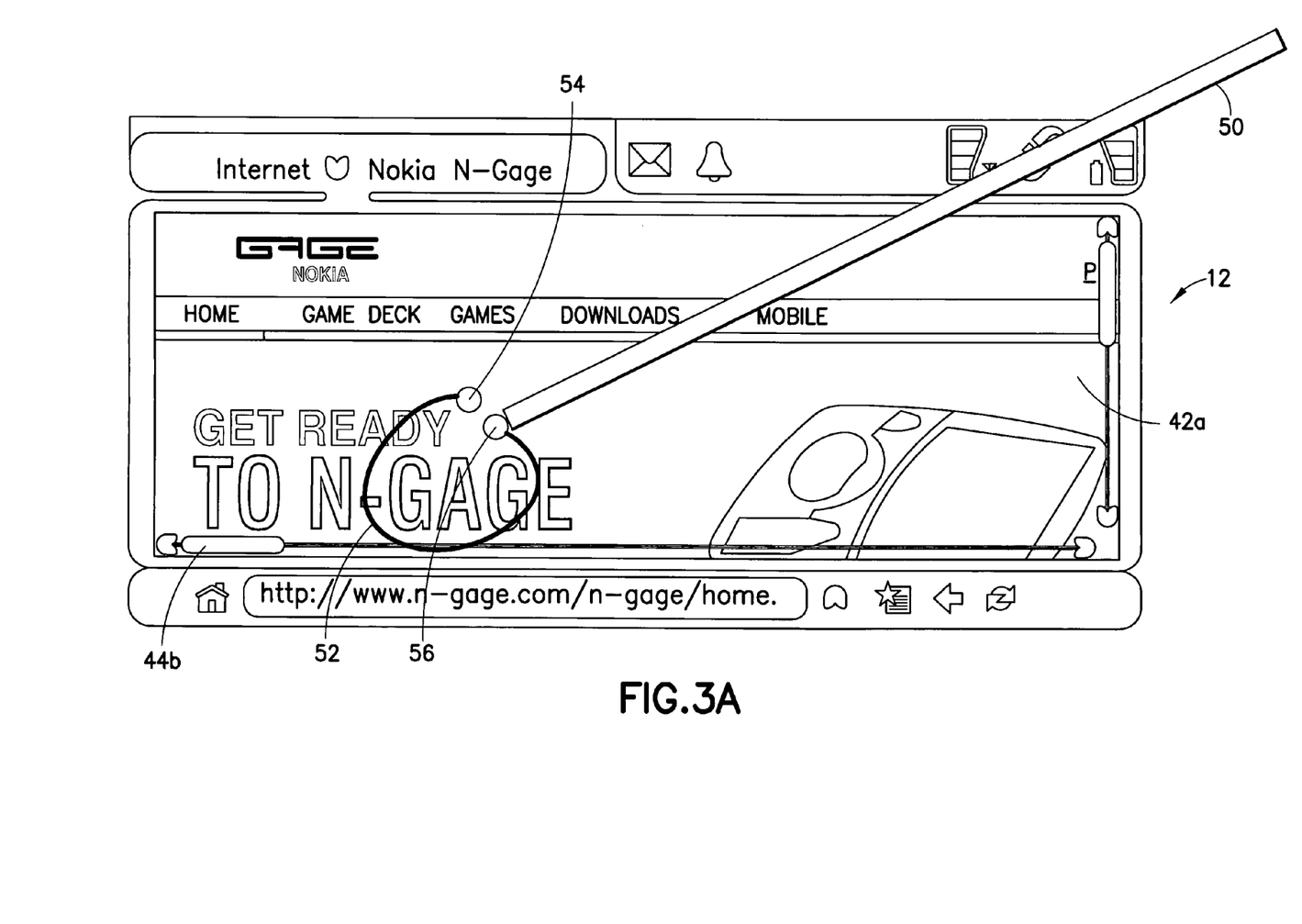
FIG. 3A is a perspective view of a stylus making a long stroke input at the touch sensitive screen of FIG. 2A.
Figure 3B:
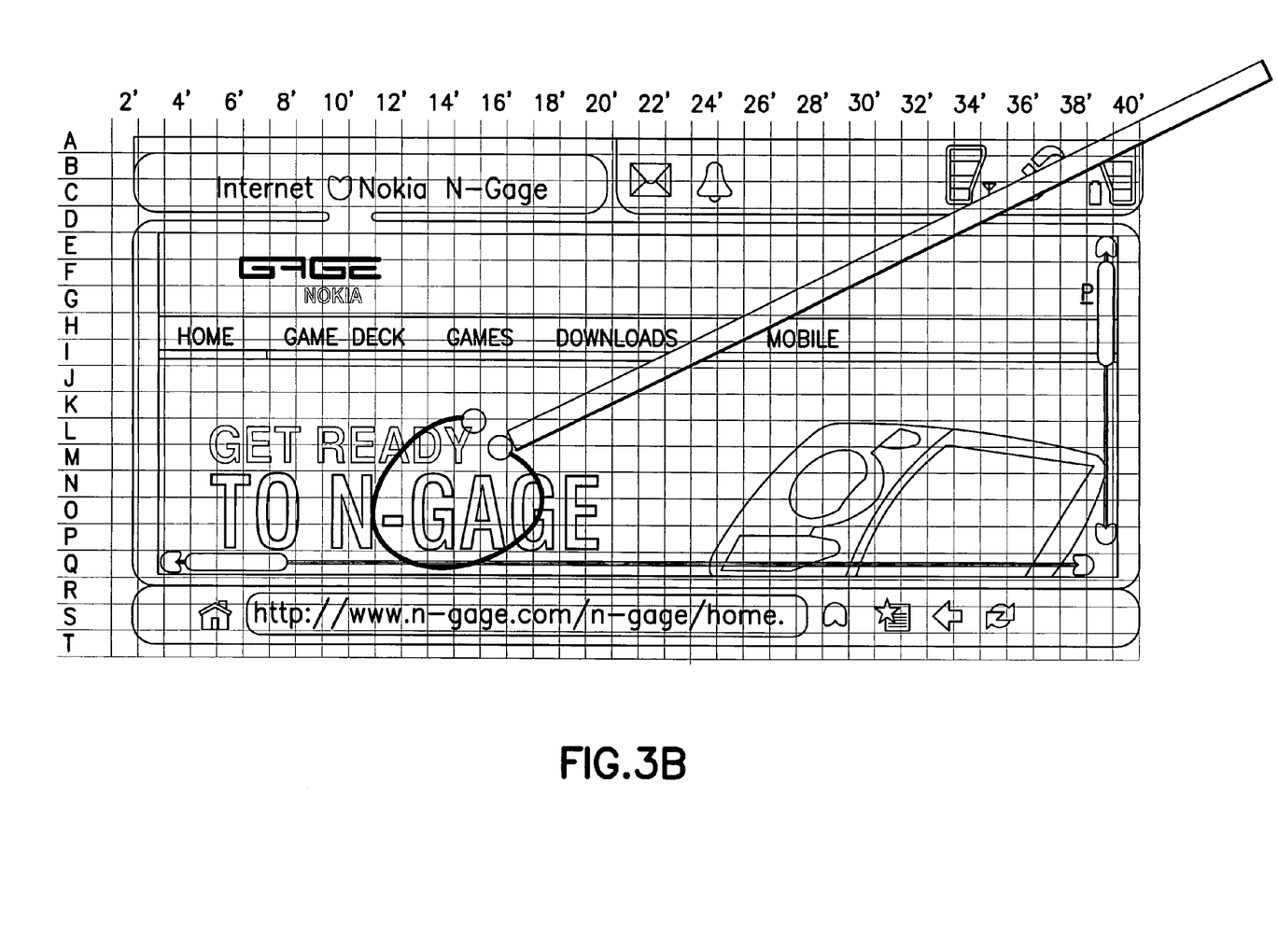
FIG. 3B is similar to FIG. 3A but with a grid representing the touch sensitive screen superimposed over it.

In the example of FIG. 3A-3B, the character 52 is a circle, the touchdown point 54 is at cell (row-column) K-15' and/or L-15', and the termination point is at cell M-16'. The touchdown 54 and termination 56 points need not be a single cell 34, as the tip of the stylus 50 may span more than a single cell 34. Though the character 52 crosses some cells 34 in row Q, which is generally the horizontal scrolling operator 44b, those particular cells 34 in row Q that are included in the cells 34 that make up the character 52 are not active for the particular graphical image 42a displayed. In the event the scrolling operator 44b were located at cells Q-13' to Q-16' so that the character 52 scribed by the stylus 50 overlapped active cells, the present invention includes suspending the cells made active only by the display program under certain conditions. Such suspending conditions include the time within a certain threshold maximum time period from a touchdown point being sensed at a cell 34 that is considered non-active by the display program, and a continuous depression of cells 34 that begins with a touchdown cell 54 that itself is not considered non-active by the display program. In this manner, a user entering a character 52 according to the present invention need not be frustrated by overlapping a cell that is considered active by the display program, so long as the overlap occurs after the touchdown point 54.

Figure 4A:
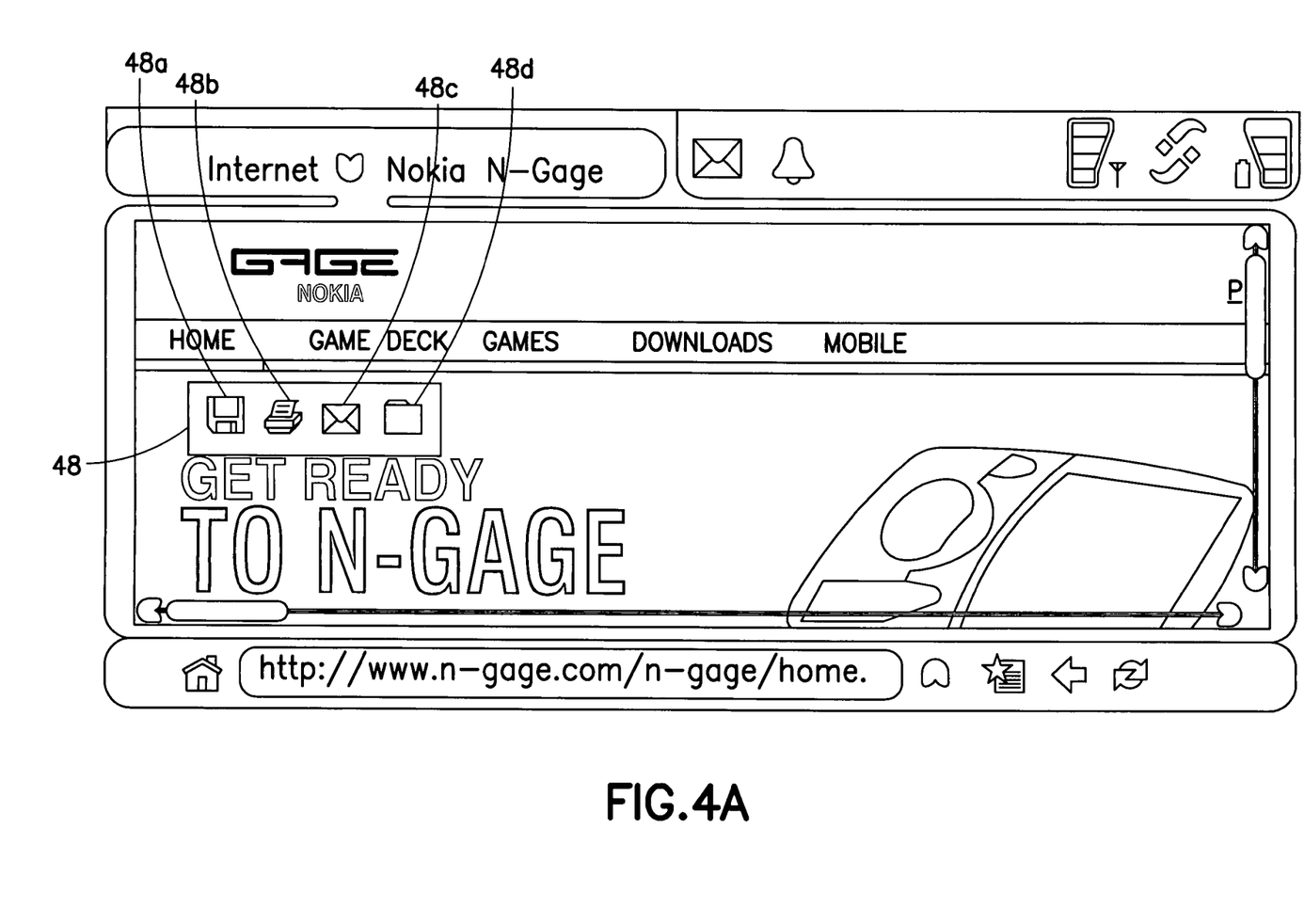
FIG. 4A is a perspective view of a series of shortcut icons superimposed over the graphic in response to the stylus entry of FIG. 3A.
Figure 4B:
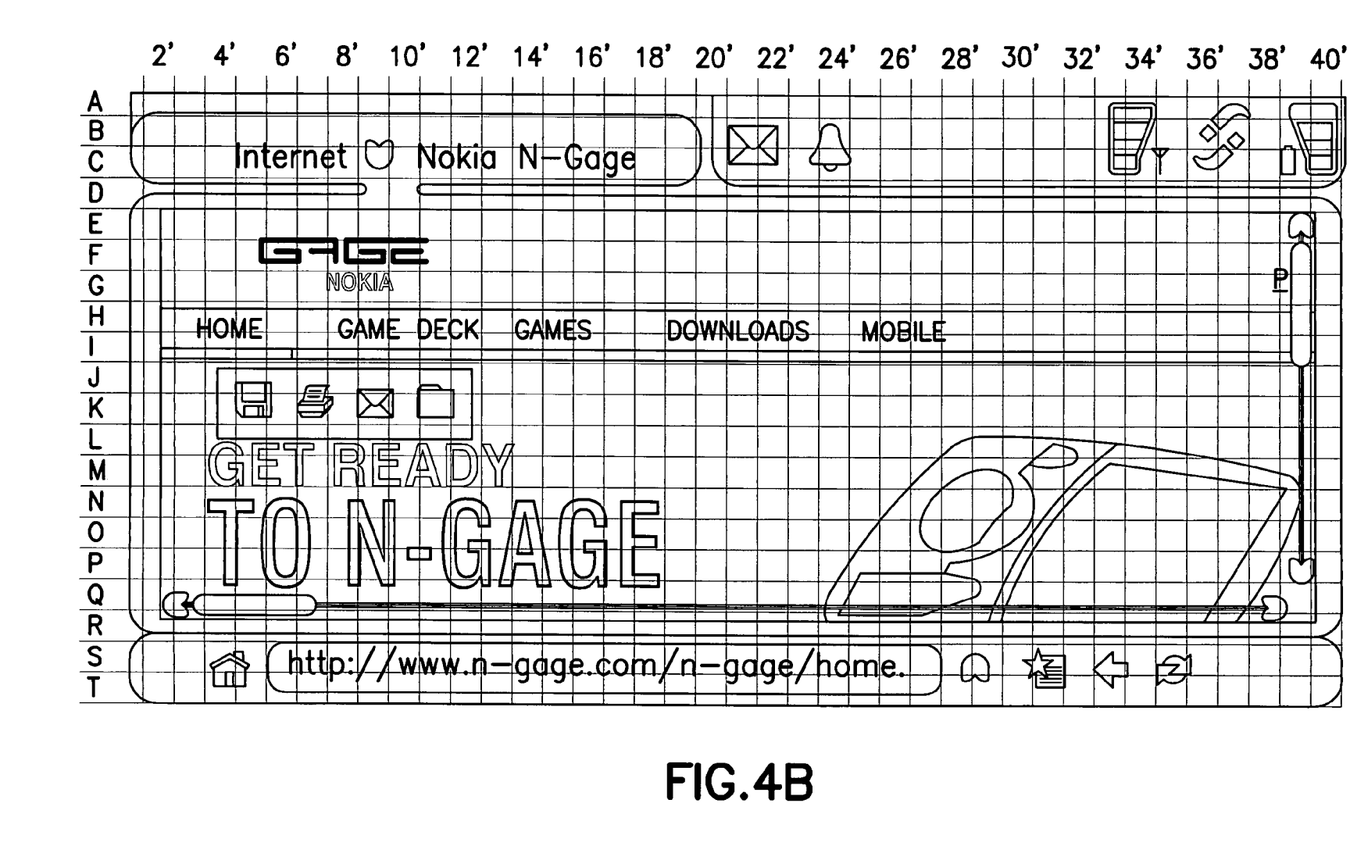
FIG. 4B is similar to FIG. 4A but with a grid representing the touch sensitive screen superimposed over it.

The result of recognizing an input at the cells deemed inactive by the display program is described at FIGS. 4A-4B. Each of the characters stored in memory corresponds to a computer command, such as a command to display a shortcut icon to another program (similar to the toolbar buttons 46a, 46b) or a submenu, a command to launch another program (similar to the email icon in the upper toolbar 47), and the like. Once the present invention favorably compares the entered character 52 to a character stored in memory (hereinafter, a command character), the device 10 executes the executable command or computer instruction associated with the command character. Preferably, each of a plurality of command characters is associated with a unique computer executable command, such as a table of command characters and associated commands. For example: the circle character of FIGS.

3A-3B may be associated with a command to display a submenu of icons, where each icon represents a shortcut to execute a program that operates on the graphical display; a "✓" command character may be associated with a command to begin a search for compatible Bluetooth™ devices, a "ʟ" symbol may be associated with a command to go to a web home page, a triangle may be associated with a command to enter a power-saving mode, and so forth. Apart from comparing only the shape of an input character to a shape of a stored command, additional parameters may be compared. For example, a touchdown point relative to the input character (e.g., touchdown point at the top of a circle) may be compared with a designated initial point in a command character, so that a touchdown point at the bottom of a circle character input will fail a comparison with a circle command character having an initial point at the top. Further, a direction of character formation may be compared (e.g., clockwise or counterclockwise circle). Where the input character is a series of substantially contiguous and continuous input points or cells (since lifting off the stylus or leaving it stationary over one cell are generally interpreted as the end of a character input), the order in which those cells are depressed determine a direction of character formation. A specific direction may be stored with the command character shape to enable more commands to be associated with a certain number of shapes.

Preferably, only characters that are not alphanumeric are associated with a computer command according to the present invention. This is to allow for easier adoption by consumers, who already naturally associate alphanumeric characters (and variations thereof, such as text recognition used with the personal digital assistants PDAs) with letters and numbers. As can be appreciated, the entered character 52 need not identically mirror an idealized command character for a successful match. For example, a command character that is a true circle may be sufficiently matched by the circle character 52 of FIGS. 3A-3B, event though the entered character 52 does not include a common cell as the touchdown point 54 and the termination point 56. In that regard, the command character may include a certain degree of variability from an idealized form, as is known in the automated handwriting recognition arts.

FIGS. 4A-4B show the results of recognizing the circle character 52 of FIGS. 3A-3B. Specifically, the circle character 52 of FIGS. 3A-3B is associated with a command to display a submenu of shortcut icons 48. Each icon 48a-d is a shortcut to execute a computer program that operates on the computer graphic. A computer program according an embodiment of the invention recognized the circle character 52 of FIGS. 3A-3B, and compared it to command characters stored in memory, each command character being associated with a computer instruction or a command. Once a positive match was found, the computer command associated with the command character matched by the character 52 scribed by the stylus 50 was executed by the host device 10.

It is noted that the display program for displaying the graphical image, the touch sensitive display 12, and the computer commands launched by the present invention may each be within the prior art. The present invention operates to interface these prior art programs and apparatus with the prior art touch sensitive screen more efficiently, so that a user need not enter an excessive number of keystrokes or stylus taps to move between software applications. The submenu of icons 48 may be generated by a prior art computer program, and operates to render the cells 34 underlying each icon 48a-d as active. The present invention operates to display that submenu of icons 48 without having to make an exceeding multiplicity of inputs at the user interface 12, 14 of the device 10.

As devices 10 become more multi-functional, transitions between existing computer programs must be made more intuitive. The present invention is in one embodiment a shortcut to access an already existing shortcut to another program. Rather than being limited to variations of a tap (such as a double tap, a long tap, etc.) on a touch sensitive display 12, the present invention enables a wide variety and a broad plurality of characters to be used as command characters. Depending upon the consumers' adaptability to the specific command characters selected, the present invention may associate three, five, ten or more prior art computer commands with different command characters to enable quicker navigation through various software programs of an electronic device.

In one embodiment, the invention includes computer instructions embodied in a computer readable medium such as a SRAM, EPROM, CD-ROM, or other computer readable medium. Preferably, such a medium is disposed within a mobile station such as a mobile phone that may have additional capabilities such as gaming, internet access, and/or a personal digital assistant. Such a mobile station has a variety of functions and a relatively small user interface, and the present invention offers a more efficient and intuitive way for a user to move between the various programs using the interface. In that respect, it serves to emulate a second (e.g., right) mouse button on a touch sensitive display 12 without undermining or otherwise altering emulation of the first (e.g., left) mouse button, which is done for by tapping or dragging at the cells 34 recognized as active by the display program.

While there has been illustrated and described what is at present considered to be a preferred embodiment of the claimed invention, it will be appreciated that numerous modifications are likely to occur to those skilled in the art. It is intended in the appended claims to cover all those modifications that fall within the spirit and scope of the claims.

What is claimed is:

1. A computer readable medium having computer instructions for performing actions comprising:
    displaying a computer generated graphical image and at least one active area comprising an attribute on a touch sensitive display using a displaying software program, the attribute comprising at least one of a scrolling operator, a toolbar icon and a hyperlink, said displaying software program being responsive to inputs at only a first active portion of the touch sensitive display when said graphical image is displayed, and non-responsive to a second inactive portion of the display;
    receiving an input character at the second inactive portion of said touch sensitive display;
    comparing said input character to a stored command character that is associated with a separate corresponding computer command; and
    executing the separate corresponding computer command if said input character matches said command character, wherein said separate corresponding computer command is to display a submenu at the touch sensitive display, said submenu comprising a plurality of shortcut links each to a different executable command.

2. The computer readable medium having computer instructions of claim 1 wherein said executable command is a command that operates on said computer generated graphical image.

3. The computer readable medium having computer instructions of claim 1 wherein the input character comprises a touchdown point and a series of substantially contiguous and continuous input points along said touch sensitive user interface.

4. The computer readable medium having computer instructions of claim 3 wherein comparing said input character to a stored command character comprises comparing a shape and a position of a touchdown point relative to said shape of the character input to a shape and initial point of said command character, and wherein the input character matches the stored command character when said shapes match and the position of the touchdown point relative to the shape matches said initial point.

5. The computer readable medium having computer instructions of claim 3 wherein comparing said received character input to a stored command character comprises comparing a shape and a direction of substantially contiguous and continuous input points of the received character input to a shape of said command character and a direction of formation associated with said command character, and wherein the input character matches the stored command character when said shapes match and the direction of substantially contiguous and continuous input points matches the direction of formation associated with the command character.

6. The computer readable medium having computer instructions of claim 3 wherein, in response to receiving the touchdown point at the portion of the touch sensitive user interface, rendering the entire touch sensitive user interface as inactive to the display program until the input character is terminated.

7. The computer readable medium having computer instructions of claim 6 wherein the input character is terminated at least when the series of contiguous and continuous input points ceases to be continuous for a minimum threshold of time.

8. The computer readable medium having computer instructions of claim 6 wherein the input character is terminated at least when the series of contiguous and continuous input points ceases to move among distinct contiguous portions of the touch sensitive user interface for a minimum threshold of time.

9. The computer readable medium having computer instructions of claim 6 wherein the input character is terminated at least when the series of contiguous and continuous input points match the stored command character.

10. The computer readable medium having computer instructions of claim 1 wherein the separate corresponding computer command is a computer command executed by a second mouse button when said displaying software program is embodied to receive an input from a mouse having a first and second button.

11. The computer readable medium having computer instructions of claim 1 executed in a mobile station.

12. A method comprising:
  displaying a computer generated graphical image and at least one active area comprising an attribute on a touch sensitive display using a displaying software program, the attribute comprising at least one of a scrolling operator, a toolbar icon and a hyperlink, said displaying software program being responsive to inputs at only a first active portion of the touch sensitive display when said graphical image is displayed, and non-responsive to a second inactive portion of the display;
  receiving an input character at the second inactive portion of said touch sensitive display;
  comparing said input character to a stored command character that is associated with a separate corresponding computer command; and
  executing the separate corresponding computer command if said input character matches said command character, wherein said separate corresponding computer command is to display a submenu at the touch sensitive display, said submenu comprising a plurality of shortcut links each to a different executable command.

13. The method of claim 12 wherein each of said executable commands is a command that operates on said computer generated graphical image.

14. The method of claim 12 wherein the input character comprises a touchdown point and a series of substantially contiguous and continuous input points along said touch sensitive user interface.

15. The method of claim 14 wherein comparing said input character to a stored command character comprises comparing a shape and a position of a touchdown point relative to said shape of the character input to a shape and initial point of said command character, and wherein the input character matches the stored command character when said shapes match and the position of the touchdown point relative to the shape matches said initial point.

16. The method of claim 14 wherein comparing said input character to a stored command character comprises comparing a shape and a direction of substantially contiguous and continuous input points of the received character input to a shape of said command character and a direction of formation associated with said command character, and wherein the input character matches the stored command character when said shapes match and the direction of substantially contiguous and continuous input points matches the direction of formation associated with the command character.

17. The method of claim 14 wherein, in response to receiving the touchdown point at the portion of the touch sensitive user interface, rendering the entire touch sensitive user interface as inactive to the display program until the input character is terminated.

18. The method of claim 12 wherein the separate corresponding computer command is a computer command executed by a second mouse button when said displaying software program is embodied to receive an input from a mouse having a first and second button.

19. A device comprising:
  a touch sensitive display;
  a display software program embodied on a computer readable medium for displaying a graphical image and at least one active area comprising an attribute at said touch sensitive display that is responsive to inputs at only the attribute of the at least one active area, the attribute comprising at least one of a scrolling operator, a toolbar icon and a hyperlink when said graphical image is displayed;
  a separate computer command embodied on a computer readable medium; and
  computer instructions embodied on a computer readable medium for receiving an input character at a portion of said touch sensitive display, excluding any of the at least one active areas, that currently displays the graphical image; for comparing said input character to a stored command character that is associated with the separate computer command; and for causing the separate corresponding computer command to be executed if said input character matches said command character;
wherein said separate computer command is to display a submenu at the touch sensitive user interface, said submenu comprising a plurality of shortcut links each to a different executable command.

20. The device of claim 19 wherein the device comprises a mobile station.

21. A portable electronic device comprising:
touch sensitive display means;
embodied display software means for displaying a graphical image and at least one active area comprising an attribute at said touch sensitive display means that is responsive to inputs at only the attribute of the at least one active area, the attribute comprising at least one of a scrolling operator, a toolbar icon and a hyperlink when said graphical image is displayed;
embodied separate computer command means; and
embodied computer instruction means for receiving an input character at a portion of said touch sensitive display means, excluding any of the at least one active areas, that currently displays the graphical image; for comparing said input character to a stored command character that is associated with the separate computer command means; and for causing the separate corresponding computer command means to be executed if said input character matches said command character; wherein said separate computer command is to display a submenu at the touch sensitive user interface, said submenu comprising a plurality of shortcut links each to a different executable command.

22. The portable electronic device of claim 21 wherein:
the touch sensitive display means comprises a touch sensitive display;
the embodied display software means comprises a display software program embodied on a computer readable medium;
the embodied separate computer command means comprises a computer command separate from the display software means embodied on a computer readable medium; and
the embodied computer instruction means comprises computer instructions embodied on a computer readable medium for receiving the input character at the portion of the touch sensitive display.

* * * * *